W. D. PATTERSON.
METHOD OF MAKING SHOES.
APPLICATION FILED MAY 28, 1914.

1,115,099.

Patented Oct. 27, 1914.
3 SHEETS—SHEET 1.

Inventor
Warren D. Patterson,

W. D. PATTERSON.
METHOD OF MAKING SHOES.
APPLICATION FILED MAY 28, 1914.
1,115,099.
Patented Oct. 27, 1914.
3 SHEETS—SHEET 2.
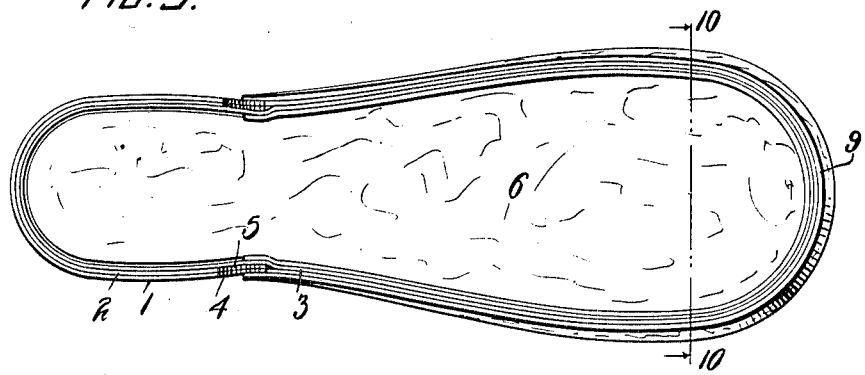
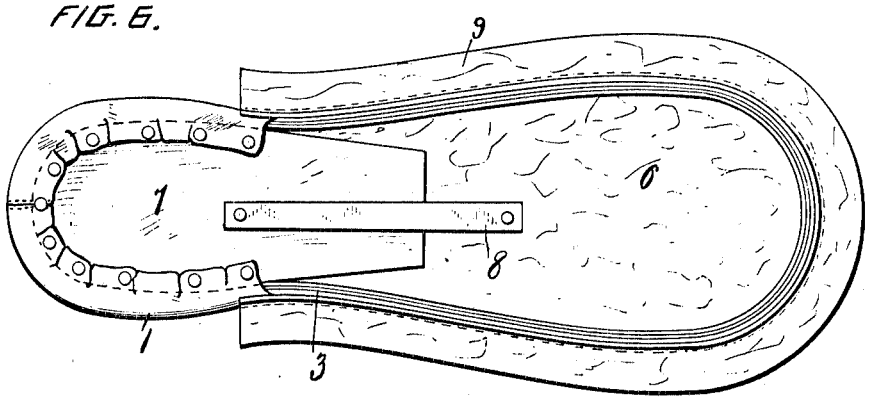
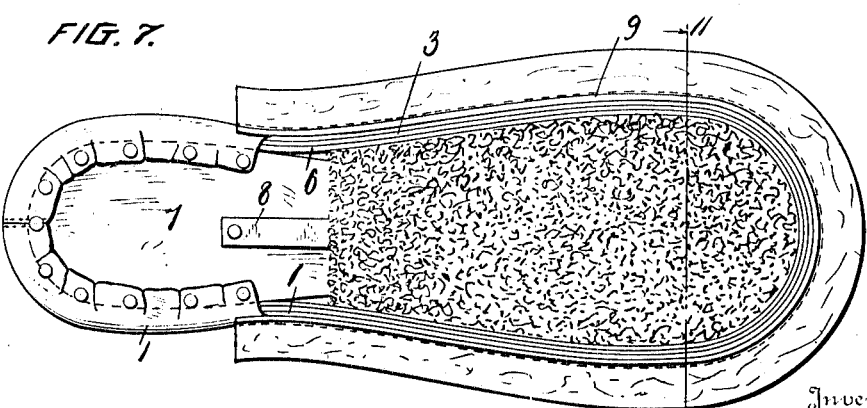
Inventor
Warren D. Patterson,

W. D. PATTERSON.
METHOD OF MAKING SHOES.
APPLICATION FILED MAY 28, 1914.

1,115,099.

Patented Oct. 27, 1914.
3 SHEETS—SHEET 3.

Inventor
Warren D. Patterson,

Witnesses

UNITED STATES PATENT OFFICE.

WARREN D. PATTERSON, OF ROCHESTER, NEW YORK, ASSIGNOR, BY MESNE ASSIGNMENTS, TO LOUISE T. GALLOWAY, OF ROCHESTER, NEW YORK.

METHOD OF MAKING SHOES.

1,115,099.

Specification of Letters Patent. Patented Oct. 27, 1914.

Application filed May 28, 1914. Serial No. 841,644.

*To all whom it may concern:*

Be it known that I, WARREN D. PATTERSON, a citizen of the United States, residing at Rochester, in the county of Monroe and State of New York, have invented certain new and useful Improvements in Methods of Making Shoes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in methods for making shoes, comprising various steps which will be hereinafter fully described, shown in the accompanying drawings and then specifically defined in the appended claims.

Figure 1:
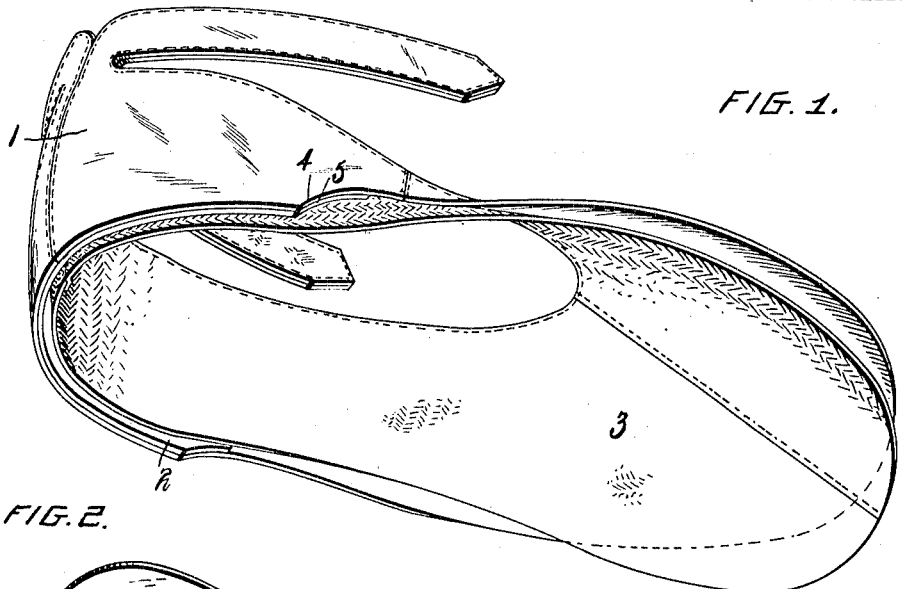
Figure 2:
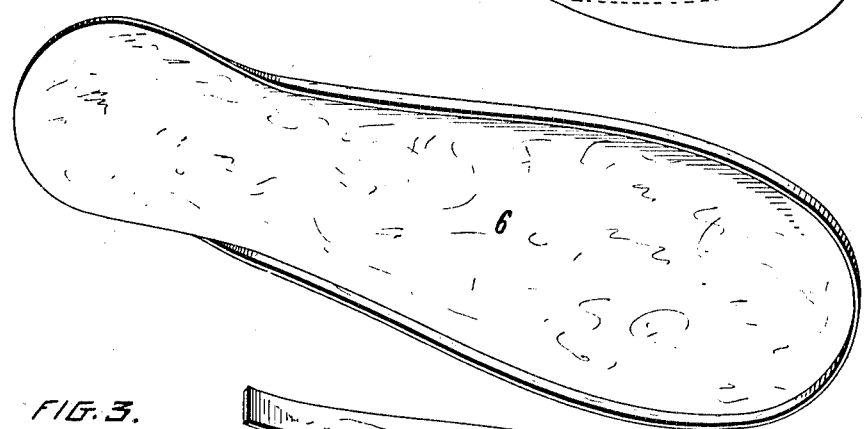
Figure 3:
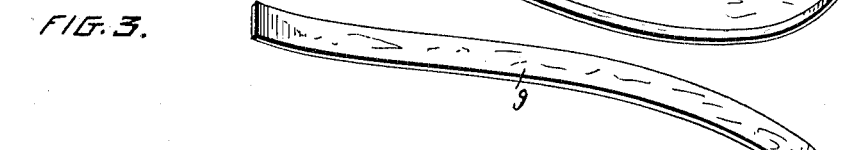
Figure 4:
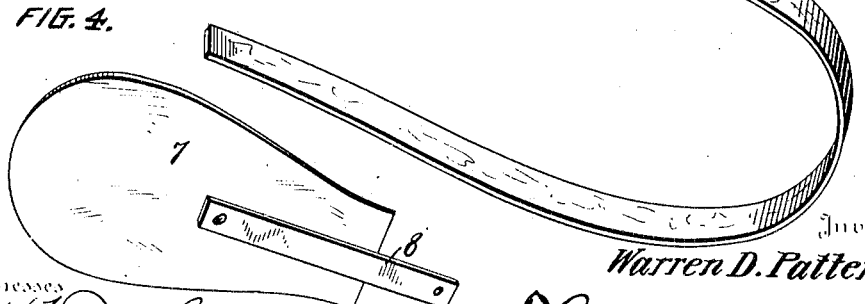
Figure 8:
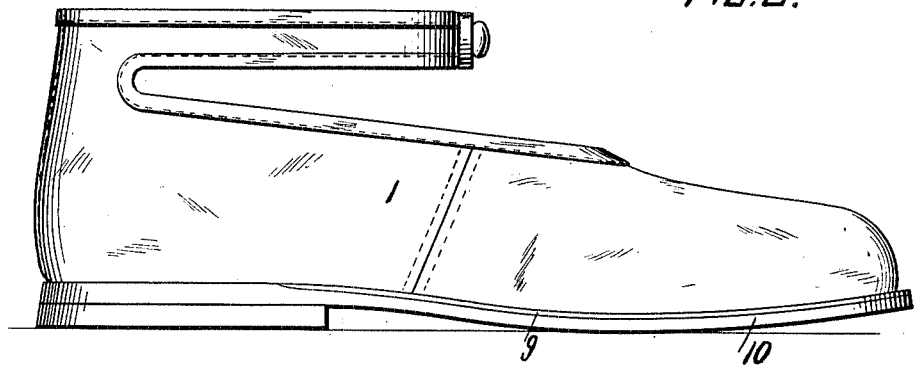
Figure 9:
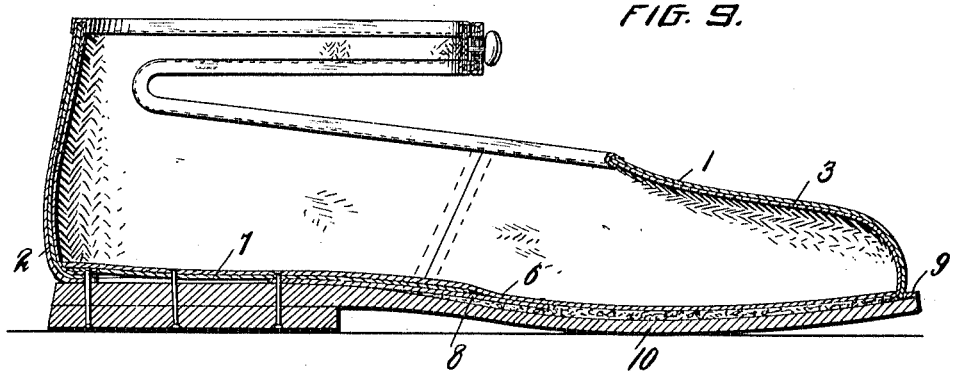
Figure 10:
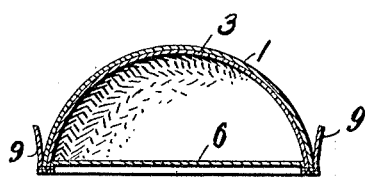
Figure 11:
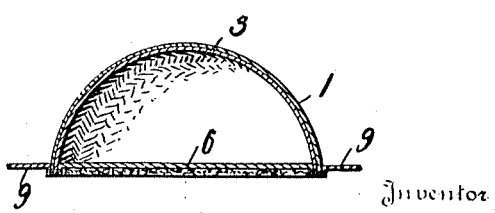

My invention is illustrated in the accompanying drawings, in which:

Figure 1 is a detail perspective view of the upper and counter shown as detached from the sole. Fig. 2 is a bottom plan view of the sock lining from the under side. Fig. 3 is a perspective view of the welt detached. Fig. 4 is a detail view of the shank piece and arch supporter. Figs. 5, 6 and 7 are bottom plan views showing different steps in the method of construction of the shoe. Fig. 8 is a side elevation of the complete shoe. Fig. 9 is a central vertical sectional view through the completed shoe. Fig. 10 is a sectional view taken on line 10, 10 of Fig. 5, and Fig. 11 is a section taken on line 11, 11 of Fig. 7.

Reference now being had to the details of the drawings by numeral, 1 designates the upper of the shoe, 2 the counter and 3 the lining to the upper, the lower marginal edge of the upper and counter being notched or cut away at the locations designated by numerals 4 and 5 in Fig. 1 of the drawings.

6 designates the sock lining or inner sole, the marginal edge of which is stitched to any portion of the marginal edge of the upper from one notched portion thereof to the other or from heel seat to heel seat. The insole or sock lining having been stitched to the upper in the manner shown, the last is inserted within the shoe. The shank piece 7 is adjusted against the heel seat and the marginal edges of the heel portion of the upper and the counter are bent over the shank piece and nails driven through the turned portions and the shank piece to hold the same securely in place. It will be noted that the heel portion of the upper and the counter, when turned as described, form a pocket to securely hold the rear end of the shank piece in place. An arch supporter 8, preferably of resilient metal, is fastened at its rear end to the shank piece and its other end projecting beyond the forward end of the latter bears yieldingly against the ball portion of the insole. The welt 9 is then stitched to the portions of the marginal edges of the upper and insole from one heel seat to the other, the ends of the welt terminating adjacent to the notched or cut away portions of the upper and counter, as shown clearly in the drawings. A cushion filler of any suitable material, such as cork, the particles of which are held together by cement, is inserted in the space intermediate the forward end of the shank piece and the end of the inner sole, said filler being flush with the stitched edges of the upper and sock lining or inner sole. The parts being thus assembled as described, the outer sole 10 is stitched the entire length of the welt, which latter terminates at the heel seat. This being accomplished, the heel is nailed on, trimmed and edge set in the usual manner.

By the provision of a shoe made in accordance with my method, it will be noted that a thoroughly flexible sole is afforded together with a metallic arch supporter, tending to support the arch of the foot of the child and, by reason of the cork filler, a cushion is afforded for the ball and forward end of the shoe.

What I claim to be new is:

1. The method of making shoes comprising first stitching a sock lining or inner sole to the marginal edge of an upper around the fore part of the shoe from one end of the heel seat to the other end thereof and afterward inserting a last in the shoe, applying a shank piece to the heel seat and turning the marginal edges of the heel portion of the upper and counter over the shank piece and attaching the same thereto, then stitching a welt to the shoe and applying and securing an outer sole in the usual manner.

2. The method of making a shoe consisting in first stitching the marginal edges of a sock lining or insole to the marginal edge of an upper forwardly of the heel seat, said upper having cut away or notched portions at said heel seat, afterward inserting a last in the shoe, applying a shank piece to the heel seat with an arch supporter which is secured to the shank piece extending forward and having its forward end positioned underneath the ball of the insole and applying a cushion filler over the forward end of the arch support and within the space intermediate the stitching of the upper and insole, folding over the marginal edges of the counter and heel portion of the upper against the outer face of the shank piece and nailing the same thereto, then stitching a welt to the fore part marginal edges of the upper and sock lining from one end of the heel seat to the other and afterward stitching an outer sole to the welt.

In testimony whereof I hereunto affix my signature in presence of two witnesses.

WARREN D. PATTERSON.

Witnesses:
ALEXANDER G. DAVIS,
SUMNER M. GALLOWAY.